United States Patent
Kim et al.

(10) Patent No.: US 7,502,411 B2
(45) Date of Patent: Mar. 10, 2009

(54) METHOD AND CIRCUIT FOR ADAPTIVE EQUALIZATION OF MULTIPLE SIGNALS IN RESPONSE TO A CONTROL SIGNAL GENERATED FROM ONE OF THE EQUALIZED SIGNALS

(75) Inventors: Ook Kim, Palo Alto, CA (US); Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 535 days.

(21) Appl. No.: 10/794,015

(22) Filed: Mar. 5, 2004

(65) Prior Publication Data

US 2005/0195894 A1    Sep. 8, 2005

(51) Int. Cl.
*H03H 7/30* (2006.01)
*H03H 7/40* (2006.01)

(52) U.S. Cl. .................. 375/229; 375/230; 375/231; 375/232; 375/233; 375/234; 375/235; 375/236; 375/316

(58) Field of Classification Search ......... 375/229–236, 375/316
See application file for complete search history.

(56) References Cited

U.S. PATENT DOCUMENTS

| | | | | |
|---|---|---|---|---|
| 5,163,066 A | * | 11/1992 | Cupo et al. ................ | 375/232 |
| 5,402,444 A | * | 3/1995 | Saito ........................ | 375/229 |
| 6,097,767 A | * | 8/2000 | Lo et al. .................... | 375/327 |
| 6,307,883 B1 | | 10/2001 | Kanada et al. ............. | 375/231 |
| 6,603,817 B1 | * | 8/2003 | Hamamoto et al. ........ | 375/257 |
| 6,605,969 B2 | * | 8/2003 | Mikhalev et al. .......... | 327/158 |
| 6,838,943 B2 | * | 1/2005 | Zamir et al. ............... | 330/304 |
| 2002/0054655 A1 | * | 5/2002 | Malkemes et al. ......... | 375/347 |
| 2002/0064108 A1 | * | 5/2002 | Miyashita et al. ......... | 369/47.35 |
| 2002/0085115 A1 | * | 7/2002 | Hebbalalu et al. ......... | 348/465 |
| 2003/0193495 A1 | * | 10/2003 | Biman et al. .............. | 345/211 |
| 2004/0047441 A1 | * | 3/2004 | Gauthier et al. ........... | 375/376 |
| 2004/0131128 A1 | * | 7/2004 | Roy et al. .................. | 375/295 |
| 2004/0264616 A1 | * | 12/2004 | Canagasaby et al. ....... | 375/359 |
| 2005/0018760 A1 | * | 1/2005 | Smith et al. ............... | 375/215 |
| 2005/0270076 A1 | * | 12/2005 | Huang et al. .............. | 327/119 |

* cited by examiner

*Primary Examiner*—Chieh M Fan
*Assistant Examiner*—Jason M. Perilla
(74) *Attorney, Agent, or Firm*—Girard & Equitz LLP

(57) ABSTRACT

In preferred embodiments, an adaptive equalization circuit including at least two equalization filters (each for equalizing a signal transmitted over a multi-channel serial link) and control circuitry for generating an equalization control signal for use by all the filters. The control circuitry generates the control signal in response to an equalized signal produced by one of the filters, and asserts the control signal to all the filters. Preferably, one filter generates an equalized fixed pattern signal in response to a fixed pattern signal (e.g., a clock signal), each other filter equalizes a data signal, and the control circuitry generates the control signal in response to the equalized fixed pattern signal. In other embodiments, the invention is an adaptive equalization circuit including an equalization filter and circuitry for generating a control signal for the filter in response to a signal indicative of a predetermined fixed pattern, a receiver including an adaptive equalization circuit, a system including such a receiver, and a method for adaptive equalization of signals received over a multi-channel serial link.

45 Claims, 6 Drawing Sheets

METHOD AND CIRCUIT FOR ADAPTIVE EQUALIZATION OF MULTIPLE SIGNALS IN RESPONSE TO A CONTROL SIGNAL GENERATED FROM ONE OF THE EQUALIZED SIGNALS

FIELD OF THE INVENTION

The invention pertains to methods and circuits for adaptive equalization of signals transmitted over a multi-channel serial link (e.g., data and clock signals over different channels of a multi-channel serial link).

BACKGROUND OF THE INVENTION

The term "transmitter" is used herein in a broad sense to denote any device capable of transmitting data over a serial link, and optionally also capable of performing additional functions which can include encoding and/or encrypting the data to be transmitted. The term "receiver" is used herein in a broad sense to denote any device capable of receiving data that has been transmitted over a serial link, and optionally also capable of performing additional functions, which can include decoding and/or decryption of the received data, and other operations related to decoding, reception, or decryption of the received data. For example, the term receiver can denote a transceiver that performs the functions of a transmitter as well as the functions of a receiver.

The expression "serial link" is used herein to denote a serial link (having any number of channels) or a channel of a serial link, where the term "channel" of a serial link denotes a portion of the link that is employed to transmit data in serial fashion (e.g., a conductor or conductor pair between a transmitter and receiver over which data are transmitted serially, either differentially or in single-ended fashion).

The term "stream" of data, as used herein, denotes that all the data are of the same type and is transmitted with the same clock frequency. In some cases, a channel of a serial link is employed to transmit one stream of data. In other cases, a channel of a serial link is employed to transmit more than one stream of data.

There are various, well-known serial links for transmitting video data and other data. One conventional serial link is known as a transition minimized differential signaling interface ("TMDS" link). This link is used primarily for high-speed transmission of video data from a set-top box to a television, and also for high-speed transmission of video data from a host processor (e.g., a personal computer) to a monitor. Among the characteristics of a TMDS link are the following:

1. video data are encoded and then transmitted as encoded words (each 8-bit word of digital video data is converted to an encoded 10-bit word before transmission);

2. the encoded video data and a video clock signal are transmitted as differential signals (the video clock and encoded video data are transmitted as differential signals over conductor pairs without the presence of a ground line); and 3. three conductor pairs are employed to transmit the encoded video, and a fourth conductor pair is employed to transmit the video clock signal.

Another serial link is the "High Definition Multimedia Interface" interface ("HDMI" link) developed Silicon Image, Inc., Matsushita Electric, Royal Philips Electronics, Sony Corporation, Thomson Multimedia, Toshiba Corporation, and Hitachi.

Another serial link is the "Digital Video Interface" ("DVI" link) adopted by the Digital Display Working Group. It has been proposed to use the cryptographic protocol known as the "High-bandwidth Digital Content Protection" ("HDCP") protocol to encrypt digital video data to be transmitted over a DVI link, and to decrypt the encrypted video data at the DVI receiver. A DVI link can be implemented to include two TMDS links (which share a common conductor pair for transmitting a video clock signal) or one TMDS link, as well as additional control lines between the transmitter and receiver. We shall describe a DVI link (that includes one TMDS link) with reference to FIG. 1. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of Extended Display Identification ("EDID") data that specifies various characteristics of the monitor, and transmission by the transmitter of control signals for the monitor. Transmitter 1 includes three identical encoder/serializer units (units 2, 4, and 5) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

In operation of the FIG. 1 system, a cable comprising connectors 20 and 21 and conductors 22 is connected between transmitter 1 and receiver 3. Conductors 22 include a conductor pair for transmitting serialized data over Channel 0 from encoder 2 to decoder 8, a conductor pair for transmitting serialized data over Channel 1 from encoder 4 to decoder 10, a conductor pair for transmitting serialized data over Channel 2 from encoder 6 to decoder 12, and a conductor pair for transmitting a video clock over Channel C from transmitter 1 to receiver 3. Conductors 22 also include wires for the DDC channel (which can be used for bidirectional I2C communication between transmitter 1 and receiver 3), a Hot Plug Detect (HPD) line, "Analog" lines for analog video transmission from transmitter 1 to receiver 3, and "Power" lines for provision of power from transmitter 1 to a receiver 3.

In the FIG. 1 system, the frequency of the video clock signal transmitted over Channel C is typically one-tenth the bit rate at which data transmission occurs over each of the data channels (Channels 0, 1, and 2), in the sense that ten data bits are transmitted over each data channel during each video clock period. This can be accomplished by employing nine delay cells in the transmitter to generate nine multiphase delayed versions of the video clock, and using the nine delayed versions of the video clock (each having a different phase) together with the video clock itself to transmit data over each of Channels 0, 1, and 2, at a rate of ten bits per video clock period.

Other serial links include the set of serial links known as Low Voltage Differential Signaling ("LVDS") links (e.g., "LDI," the LVDS Display Interface), each of which satisfies the TIA/EIA-644 standard or the IEEE-1596.3 standard, ethernet links, fiberchannel links, serial ATA links used by disk drives, and others.

During high-speed serial data transmission over a link (a cable and/or connectors and/or PCB traces), the link itself introduces losses and dispersion which reduce the signal quality at the receiver end. As the frequency of the transmitted signal and/or the transmission distance increases, the distortion due to frequency dependent delay and attenuation increases, increasing the chance of false detection of signals received and in some cases making the eye at the receiver almost unusable.

Transmission of signals indicative of data (e.g., video or audio data) to a receiver over a serial link degrades the data, for example by introducing time delay error (sometimes referred to as jitter) to the data. In effect, a link applies a filter to the signals during propagation over the link. The filter (to be referred to herein as a "cable filter," although the link may consist of or include PCB traces) can cause inter-symbol interference (ISI).

Equalization is the application of an inverted version of a cable filter to signals received after propagation over a link. The function of an equalization filter (sometimes referred to as an "equalizer") is to compensate for, and preferably cancel, the cable filter.

Adaptive equalization has been used to restore signal integrity by compensating for the frequency dependent attenuation that occurs during high speed serial data transmission. However, circuitry for performing the attenuation estimation needed for adaptive equalization has been complex and difficult to implement. This is especially true in the case of circuitry for estimating the attenuation of data transmitted over each of two or more channels of multi-channel serial link, in order to perform adaptive equalization of the data transmitted over each channel.

Various methods have been developed for adaptive equalization. However, equalization circuitry in a receiver cannot easily determine the optimum equalization filter to apply to a received signal unless the receiver knows what the transmitted signal looked like. Without a stable algorithm, adaptive equalization can converge into local minimization or can oscillate, depending on the data pattern itself.

SUMMARY OF THE INVENTION

In a class of embodiments, the invention is an adaptive equalization circuit comprising at least two equalization filters (each coupled and configured to equalize a different signal in a manner at least partially determined by an equalization control signal) and control circuitry for generating the equalization control signal for use by all the equalization filters. Typically, each equalization filter is coupled to receive a signal that has propagated over a different channel of a multi-channel serial link. The control circuitry is coupled and configured to generate the equalization control signal in response to an equalized signal asserted at the output of one of the filters, and to assert the equalization control signal to all the filters. Typically, the equalization control signal is indicative of at least one equalization control value and is used to set at least one equalization parameter of each equalization filter (e.g., to control the amount of equalization applied by each filter). Adaptive equalization in accordance with preferred embodiments of the invention is much simpler and more robust than conventional adaptive equalization.

In preferred embodiments, one of the equalization filters equalizes a "fixed pattern" signal (a signal having a fixed pattern, e.g., a clock signal or a signal indicative of a fixed pattern of binary data which can be a repeating pattern) thereby generating an equalized fixed pattern signal, each other equalization filter equalizes another signal (e.g., a data signal), and the control circuitry generates the equalization control signal in response to the equalized fixed pattern signal. In typical preferred embodiments, the fixed pattern signal is a clock signal (received over a clock channel of a multi-channel serial link), and the equalized fixed pattern signal is an equalized clock signal.

The control circuitry can be configured to assume that the input signal it receives is an equalized fixed pattern signal having a predetermined fixed pattern (e.g., an equalized clock signal having a periodic waveform that is known a priori). In this case, the control circuitry can easily be configured in accordance with the invention to generate the equalization control signal in response to the input signal it receives.

In another class of embodiments, the control circuitry is configured to monitor the input signal it receives to identify when the input signal is indicative of a predetermined fixed pattern (e.g., to identify a segment of the input signal which is indicative of a burst of bits having a predetermined pattern, and to treat such segment as an equalized fixed pattern signal). In such embodiments, the control circuitry is typically configured to sample (periodically) the input signal it receives, but to use only some of the samples to generate the equalization control signal (only those samples that the control circuitry subsequently determines were obtained when the input signal was indicative of the predetermined fixed pattern, i.e., only samples from each segment of the input signal that is indicative of the predetermined fixed pattern). Examples of embodiments in this class are those in which the input signal received by the control circuitry is an equalized data signal indicative of a sequence of special characters (e.g., special characters of the type sent over a DVI link, or comma characters of the type sent over IBM-coded serial links such as fibre channel links) and data words, and at least one of the special characters is indicative of the predetermined fixed pattern.

Other aspects of the invention are a receiver that includes any embodiment of the inventive adaptive equalization circuit, and a system including a transmitter, a multi-channel serial link, and any embodiment of the inventive receiver. In use, a typical embodiment of the inventive receiver is coupled to a transmitter by a multi-channel serial link, and the transmitter transmits a clock signal and data signals over channels of the link having identical or nearly identical transfer functions (transmitted amplitude as a function of frequency). Typically, the transmitter uses the clock signal to transmit the data signals (e.g., the transmitter uses delayed versions of the clock signal, each having a different phase, together with the clock signal itself to transmit the data signals) and also transmits the clock signal, and the data signals have a bit rate that is greater than (e.g., a multiple of) the clock signal's frequency. In the receiver, control circuitry of the adaptive equalization circuit samples an equalized version of the clock signal, rather than an equalized version of one of the data signals, to generate an equalization control signal for use by all the equalization filters.

In preferred embodiments, the control circuitry of the inventive adaptive equalization circuit includes phase-locked loop circuitry (a "PLL") configured to generate a stabilized version of an equalized fixed pattern signal (a "stabilized" signal) and also multiple delayed versions of the stabilized signal (each having a different phase). The control circuitry also includes a control signal generation circuit coupled to receive all or some of the delayed versions of the stabilized signal (e.g., two delayed versions of the stabilized signal) and the equalized fixed pattern signal itself. The control signal generation circuit is configured to sample the equalized fixed pattern signal using each of at least two delayed versions of the stabilized signal received from the PLL, and to generate an equalization control signal from the samples of the equalized fixed pattern signal.

In other embodiments, delay-locked loop circuitry (a "DLL") is used rather than a PLL to generate a stabilized version of an equalized fixed pattern signal (a "stabilized" signal) and also multiple delayed versions of the stabilized signal.

In some preferred embodiments, the stabilized signal is a stabilized version of an equalized clock signal and the control signal generation circuit acquires two samples of the equalized clock signal per clock cycle (i.e., per cycle of the equalized clock signal), at different times during the same half cycle of the equalized clock signal. The control signal generation circuit generates the equalization control signal by comparing the two samples or subtracting one sample from the other (and optionally filtering the result of such comparison or subtraction). The equalization control signal is indicative of the condition of equalization of the equalized clock signal, and is used to control each equalization filter of the adaptive equalization circuit. In implementations in which the equalization control signal is indicative of a value equal (or proportional) to the difference between each pair of samples generated in one clock cycle, the adaptive equalization circuit implements a control loop that operates to minimize the difference between the sample pairs and thereby achieve optimal equalization of the clock signal. When the adaptive equalization circuit is coupled to receive and equalize data signals and a clock signal that have been transmitted over different channels of a multi-channel serial link (the channels all having identical or similar transfer functions), use of the equalization control signal to equalize the data signals as well as the clock signal achieves optimal (or nearly optimal) equalization of each data signal as well as of the clock signal.

In variations on the implementations described in the previous paragraph, the control signal generation circuit acquires two samples of the equalized clock signal during different clock cycles (e.g., one during a first cycle at a first time after the equalized clock signal's most recent positive-going zero crossing, and another during another cycle at a second time after the equalized clock signal's most recent positive-going zero crossing), and generates the equalization control signal by comparing the two samples or subtracting one sample from the other (and optionally filtering the result of such comparison or subtraction). In other variations on the implementations described in the previous paragraph, the control signal generation circuit acquires N samples of the equalized clock signal (where $N \geq 2$) per clock cycle (or during each set of M consecutive clock cycles, where $M \geq 2$), and generates the equalization control signal as a result of processing the N samples.

In some of the implementations described in the two previous paragraphs, the control signal generation circuit acquires each sample of the equalized clock signal at a fixed time relative to the start of a cycle of the equalized clock signal (e.g., at a fixed time after the equalized clock signal's most recent positive-going zero crossing). In other ones of the implementations described in the two previous paragraphs, the control signal generation circuit acquires samples of the equalized clock signal at variable times within cycles of the equalized clock signal (e.g., at a first time after the most recent positive-going zero crossing during a first cycle, and then at a second time after the most recent positive-going zero crossing during another cycle).

In accordance with preferred embodiments of the invention, adaptive equalization is performed in a receiver coupled to a serial link having at least two serial channels, including a clock channel and at least one data channel. Typically, the channels are high speed serial channels, but the bit rate at which data are transmitted over each data channel is greater than frequency of a clock transmitted over the clock channel. For example, in typical cases, a transmitter employs multiple delay cells to generate multiphase delayed versions of the clock transmitted over the clock channel. These delayed versions of the clock (each having a different phase) are used together with the clock itself to transmit data over each of the data channels, so that two or more (e.g., ten) bits of data are transmitted over each data channel per clock cycle. Adaptive equalization circuitry in the receiver equalizes the clock signal received on the clock channel, and applies the same equalization to the signal received on each data channel.

In another class of embodiments, the invention is an adaptive equalization method including the steps of transmitting signals over a serial link to a receiver that includes a set of adaptive equalization filters, where the set of adaptive equalization filters includes a first equalization filter; generating an equalization control signal in a control loop including the first equalization filter, while the first equalization filter operates to equalize one of the signals transmitted over the link to the receiver; generating a first equalized signal, by equalizing said one of the signals in the first equalization filter in a manner at least partially determined by the equalization control signal; and equalizing each other one of the signals transmitted over the link to the receiver, in a different one of the adaptive equalization filters of said set other than the first equalization filter, in a manner at least partially determined by the equalization control signal.

In preferred embodiments, the inventive adaptive equalization circuit is configured to equalize data signals received on each of three data channels of a DVI or HDMI link, and a pixel clock signal received on the pixel clock channel of the link. The adaptive equalization circuit applies an identical equalization filter to each of the four signals. The data signals are indicative of video data and optionally also other data (such as audio data). The frequency of the clock signal is one tenth the bit rate of the data signal received on each data channel, but the clock signal and each data signal propagate through almost identical paths from source to receiver. Therefore, it is appropriate to apply the same (or substantially the same) equalization filter to each channel. In accordance with the invention, an adaptive equalization scheme is applied to equalize the clock signal (received on the clock channel), and the same equalization is applied to each data channel.

BRIEF DESCRIPTION OF THE DRAWINGS

In FIGS. 5A, 5B, and 5C, "fspeed" is the bit rate of the data transmitted over each data channel of such implementation of FIG. 2.

FIG. 5B is the transfer function of the equalization filter applied by each of equalization blocks 40, 41, 42, and 43 of the FIG. 4 circuit (in the implementation of FIG. 2 whose channels have the FIG. 5A transfer function) to the data or clock signal received at its input. The gain increases with increasing frequency, up to a cutoff frequency (greater than fspeed/2).

FIG. 5C is a graph of the product of the transfer functions of FIG. 5A and FIG. 5B. The overall gain (as a function of frequency) graphed in FIG. 5C is unity at frequencies up to a value greater than fspeed/2.

DETAILED DESCRIPTION OF PREFERRED EMBODIMENTS

In preferred embodiments, the invention is a method and apparatus for performing adaptive equalization on clock and data signals transmitted over different channels of a multi-channel serial link, where the link includes a clock channel (over which the clock signal propagates) and at least one data channel. A data signal is transmitted serially over each data channel. In alternative embodiments, the invention is a method and apparatus for performing adaptive equalization on a fixed pattern signal and at least one other signal transmitted over a multi-channel serial link. The following description of the preferred embodiments also applies to the alternative embodiments, with minor modifications that will be apparent to those of ordinary skill in the art (e.g., substitution of references to a transmitted fixed pattern signal for references to a transmitted clock signal).

Figure 1:
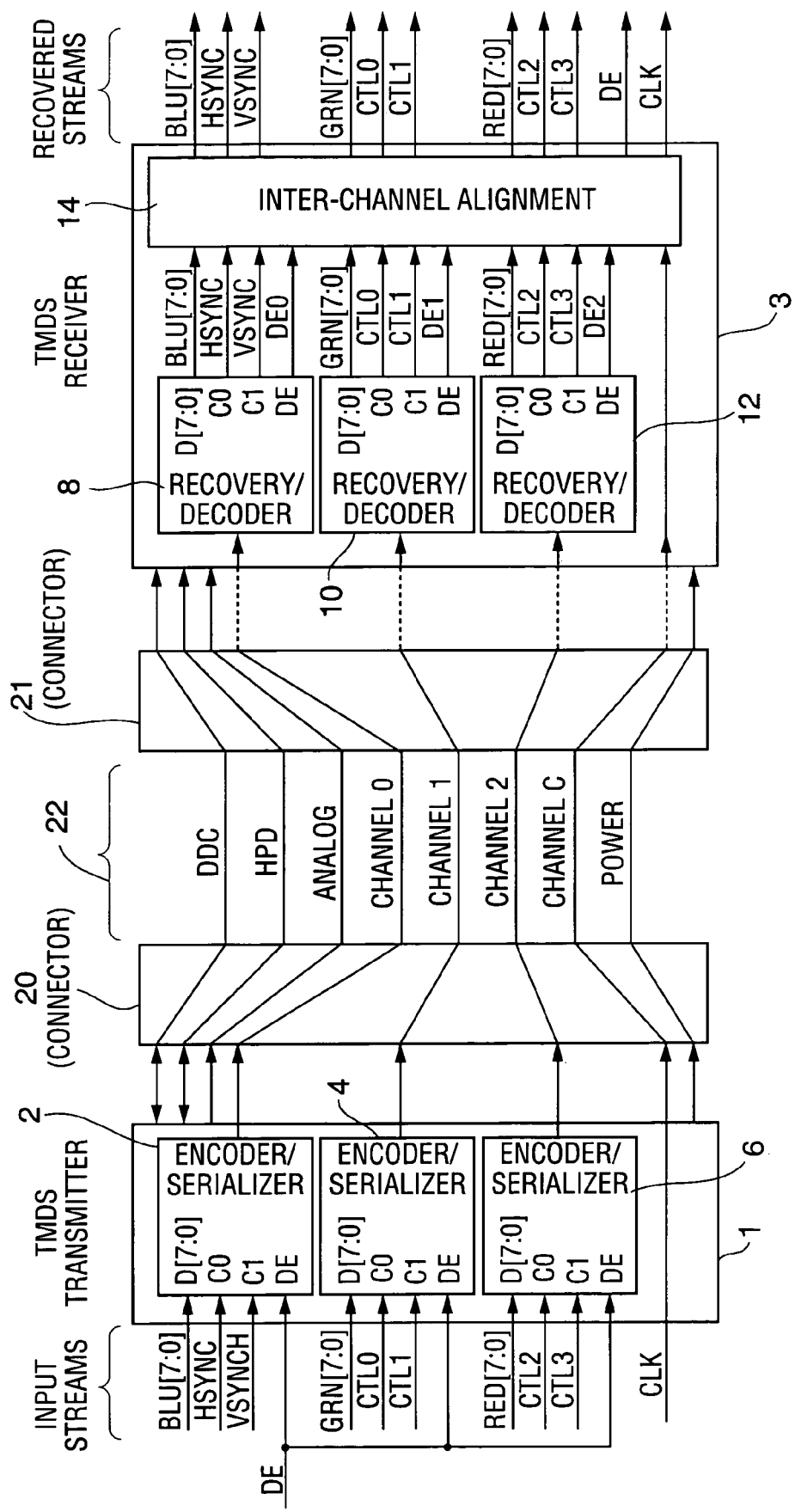
FIG. 1 is a simplified block diagram of a conventional system for transmitting data over a DVI link (that includes one TMDS link). The system includes a transmitter, a receiver, and a cable between the transmitter and receiver.
Figure 2:
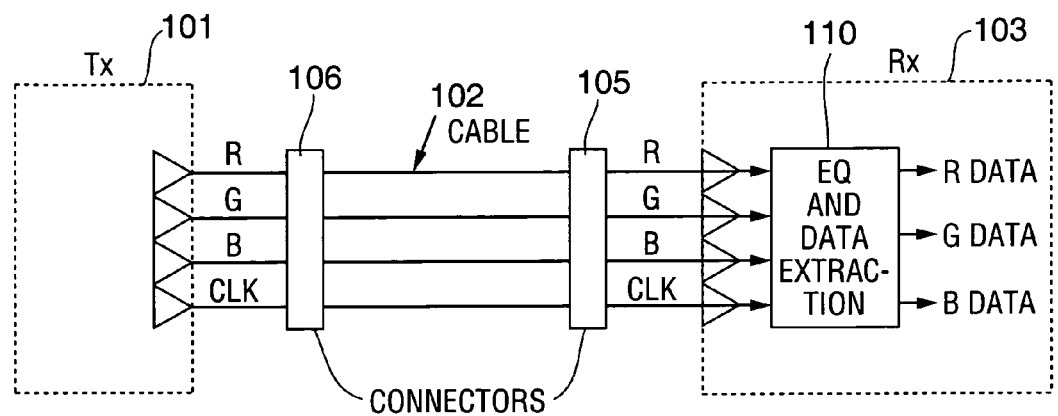
FIG. 2 is a simplified block diagram of a system that embodies the invention.

FIG. 2 is a simplified block diagram of a system that embodies the invention. The FIG. 2 system includes transmitter 101, receiver 103, and cable 102 (including connectors 105 and 106) connected between transmitter 101 and receiver 103. Transmitter 101 transmits three channels of data (typically video data and audio data) serially over cable 102: a first data channel (labeled the "R" channel, and also referred to as the "red" channel); a second data channel (labeled the "G" channel, and also referred to as the "green" channel); and a third data channel (labeled the "B" channel, and also referred to as the "blue" channel). Transmitter 101 also transmits a clock signal (typically a pixel clock for video data transmitted over the R, G, and B channels) over a clock channel (labeled the "CLK" channel).

Receiver 103 includes equalization and data extraction circuit 110. Circuit 110 is configured to perform adaptive equalization on the signal received on each of the R, G, B, and CLK channels, and to use the equalized clock signal to recover a bit stream from each of the equalized data signals. In FIG. 2, a bit stream recovered from the equalized data signal received on the red channel is labeled as "R data," a bit stream recovered from the equalized data signal received on the green channel is labeled as "G data," and a bit stream recovered from the equalized data signal received on the blue channel is labeled as "B" data.

Figure 3:
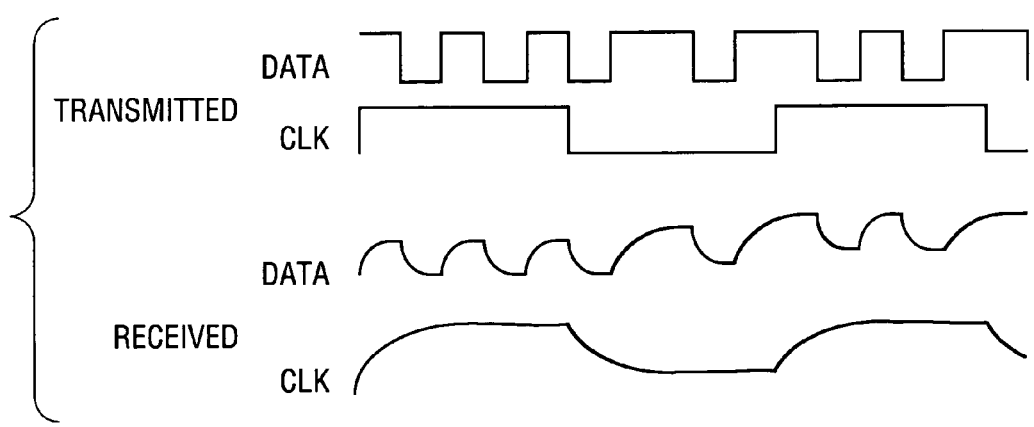
FIG. 3 is a diagram of the waveforms of data and clock signals (the upper two waveforms of FIG. 3) that can be transmitted by a preferred implementation of transmitter 101 of FIG. 2, and waveforms of these data and clock signals as received (before equalization) by a preferred implementation of receiver 103 of FIG. 2 (the lower two waveforms of FIG. 3). The bit rate of the transmitted data signal ("Data") is ten times the frequency of the transmitted clock signal ("CLK").

The serial link between transmitter 101 and receiver 103 can be a DVI or HDMI link, in which case the signal transmitted over each of the R, G, B, and CLK channels is a differential signal transmitted over a conductor pair. In the case that the serial link between transmitter 101 and receiver 103 is DVI or HDMI link, the waveforms of the data and clock signals transmitted over the CLK channel and any one of the R, G, and B channels can resemble the upper two waveforms of FIG. 3. The bit rate of the transmitted data signal (labeled "Data" in FIG. 3) is ten times the frequency of the transmitted clock signal (labeled "CLK" in FIG. 3). However, the actual signal received by receiver 103 is attenuated by PCB traces and connectors in transmitter 101 and by cable 102. The received, attenuated data and clock signals can have waveforms that resemble the lower two waveforms of FIG. 3, before they undergo equalization in equalization and data extraction circuit 110.

Figure 4:
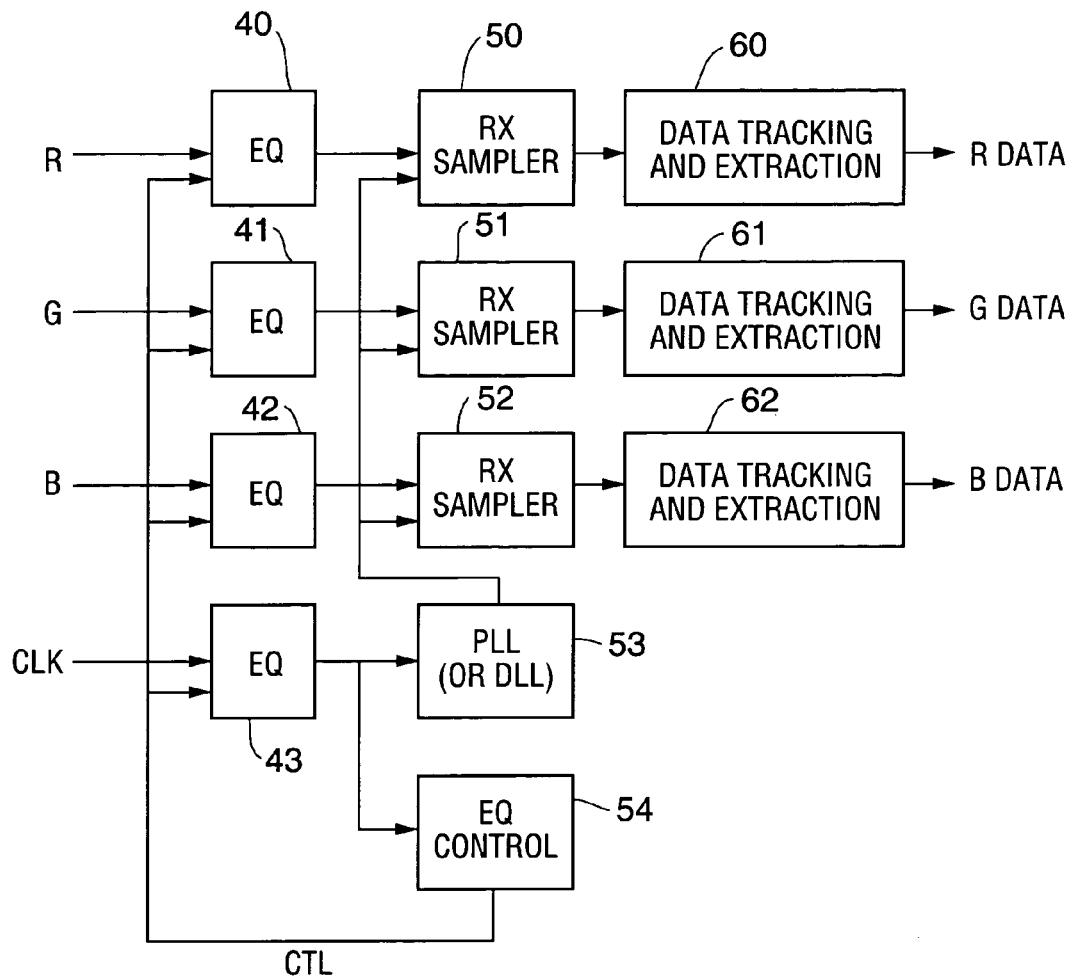
FIG. 4 is a block diagram of a preferred implementation of circuit 110 of FIG. 2, which includes an embodiment of the inventive adaptive equalization circuit.

FIG. 4 is a block diagram of a preferred implementation of circuit 110 of FIG. 2. Elements 40, 41, 42, 43, 53, and 54 of FIG. 4, connected as shown, are an embodiment of the inventive adaptive equalization circuit.

In FIG. 4, equalization block 40 equalizes the signal received on data channel R of FIG. 2 in response to the control signal CTL generated by equalization control signal generation circuit 54. Equalization block 41 equalizes the signal received on data channel G of FIG. 2 in response to the control signal CTL generated by equalization control signal generation circuit 54, equalization block 42 equalizes the signal received on data channel B of FIG. 2 in response to the control signal CTL generated by equalization control signal generation circuit 54, and equalization block 43 equalizes the pixel clock signal received on the clock channel of FIG. 2 in response to the control signal CTL generated by equalization control signal generation circuit 54. Preferably, blocks 40, 41, 42, and 43 are identical so they produce identical outputs in response to identical input signals (if the same control signal CTL is asserted to each). Each of blocks 40, 41, 42, and 43 applies an equalization filter to an input signal, and thus each block is sometimes referred to herein as an "equalization filter."

The control signal CTL is generated by circuit 54 in a manner to be described below, including by sampling the equalized clock signal CLK output from block 43 using sampling edges generated by phase-locked loop circuitry (PLL) 53. The same control signal CTL is used by each of blocks 40, 41, 42, and 43 to equalize the CLK signal received on the clock channel and the data signals received on the R, G, and B channels in the same manner.

The equalized clock signal generated by block 43 is asserted to PLL 53. A stabilized version of this clock signal, and delayed versions thereof, are asserted from PLL 53 to each of data sampling blocks 50, 51, and 52.

Block 50 samples the equalized data signal from block 40 using the stabilized clock signal (and delayed versions thereof) from PLL 53 and asserts the resulting sequence of samples to data tracking and extraction block 60. In response, block 60 outputs a sequence of recovered data bits (the bit stream labeled "R data" in each of FIGS. 2 and 4). Block 51 samples the equalized data signal from block 41 using the stabilized clock signal (and delayed versions thereof) from PLL 53 and asserts the resulting sequence of samples to data tracking and extraction block 61. In response, block 61 outputs a sequence of recovered data bits (the bit stream labeled "G data" in each of FIGS. 2 and 4). Block 52 samples the equalized data signal from block 42 using the stabilized clock signal (and delayed versions thereof) from PLL 53 and asserts the resulting sequence of samples to data tracking and extraction block 62. In response, block 62 outputs a sequence of recovered data bits (the bit stream labeled "B data" in each of FIGS. 2 and 4).

Figure 5A:
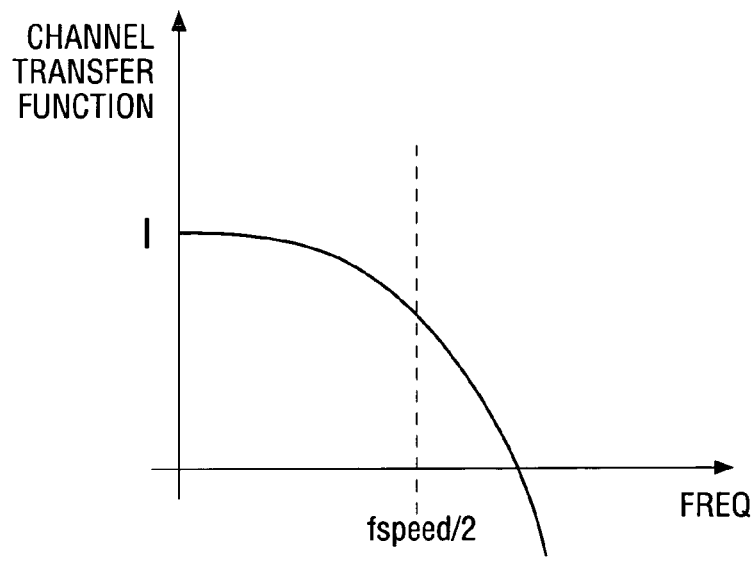
FIG. 5A is the transfer function of each of the data and clock channels of a typical implementation of FIG. 2.
Figure 5B:
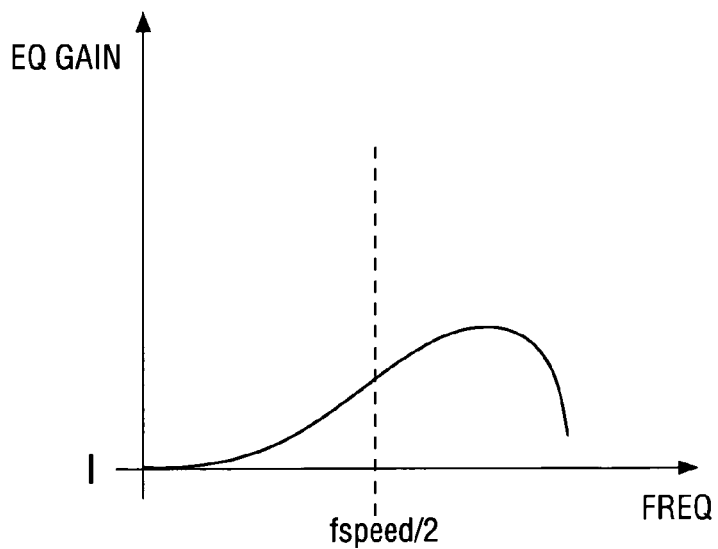
Figure 5C:
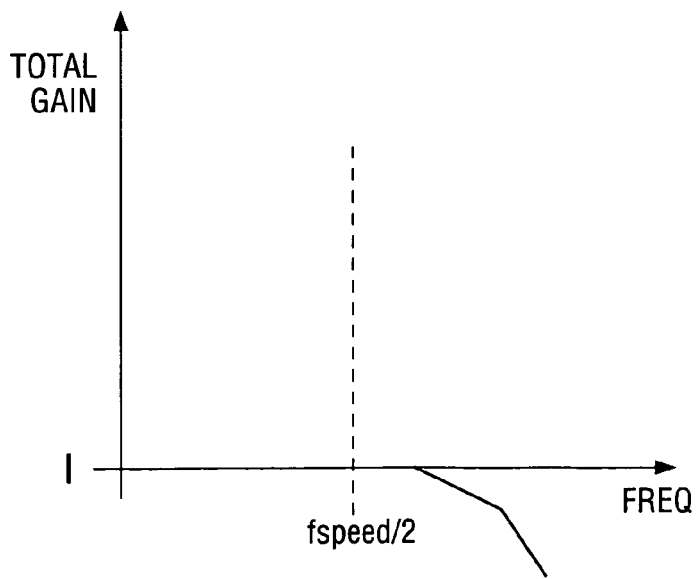

FIG. 5A is the transfer function of each of the data and clock channels of a typical implementation of the FIG. 2 system. In FIGS. 5A, 5B, and 5C, "fspeed" is the bit rate of the data transmitted over each data channel of such implementation of FIG. 2. As apparent from FIG. 5A, the signal transmitted over each data and clock channel is attenuated more (during transmission through the channel) as its frequency increases.

FIG. 5B is the transfer function of the equalization filter applied by each of equalization blocks 40, 41, 42, and 43 of the FIG. 4 circuit (in the implementation of FIG. 2 having the FIG. 5A transfer function) to the data or clock signal received at its input. The gain increases with increasing frequency, up to a cutoff frequency (greater than fspeed/2). FIG. 5C is a graph of the product of the transfer functions of FIG. 5A and FIG. 5B. As apparent from FIG. 5C, the overall gain that is applied to the equalized signal output from each of blocks 40, 41, 42, and 43 (as a result of transmission from transmitter 101 to receiver 103 and equalization by the equalization circuitry in receiver 103) is unity, at frequencies up to a frequency greater than fspeed/2.

Figure 6:
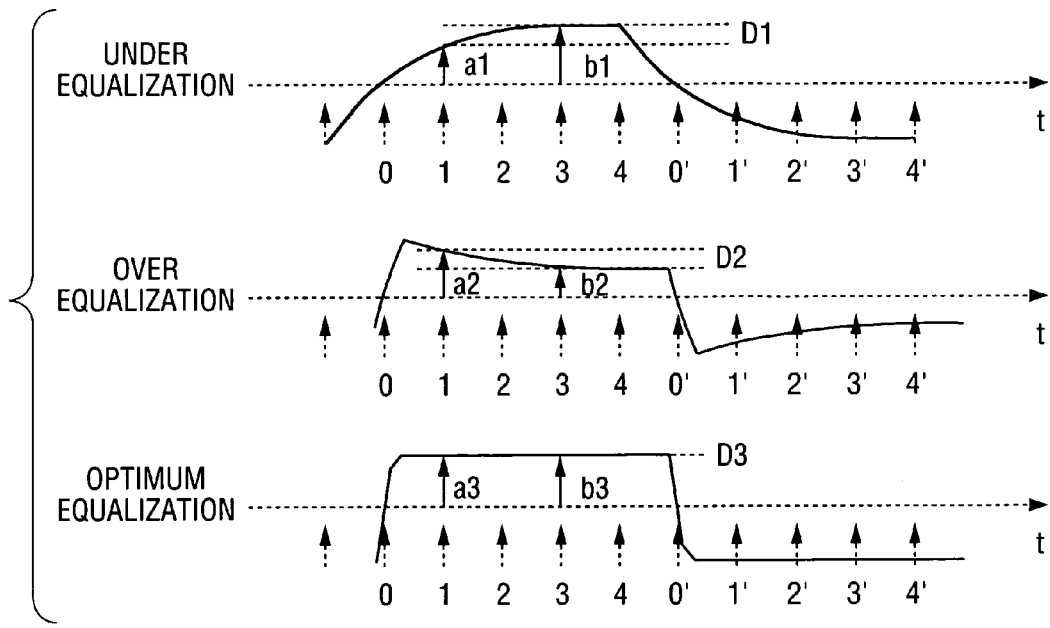
FIG. 6 is a set of three waveforms, of typical equalized clock signals output from block 43 of the FIG. 4 circuit. The top waveform results from under-equalization of a clock signal by block 43, the middle waveform results from over-equalization of a clock signal by block 43, and the bottom waveform results from optimal equalization of a clock signal by block 43. Sample times t=1, and t=3, in FIG. 6 are the times during each clock cycle at which a preferred embodiment of equalization control signal generation circuit 54 samples each equalized clock signal.

FIG. 6 is a set of three waveforms, of typical equalized clock signals output from block 43 of the FIG. 4 circuit. The top waveform results from under-equalization of a clock signal by block 43, the middle waveform results from over-equalization of a clock signal by block 43, and the bottom waveform results from optimal equalization of a clock signal by block 43.

In a class of preferred embodiments, equalization control signal generation circuit 54 samples each equalized clock signal output from block 43 twice during the first half (or second half) of each clock period, and generates the control signal CTL to be indicative of the difference between the two sampled values of the equalized clock signal. For example, such an embodiment of circuit 54 samples the under-equalized clock signal of FIG. 6 twice in one clock cycle to generate sample "a1" at time t=1, and sample "b1" at time t=3, and generates the control signal CTL such that CTL is indicative of a positive value (e.g., CTL is indicative of the sampled clock value "b1" minus the sampled clock value "a1"). In response to such a positive value of CTL, all of blocks 40, 41, 42, and 43 apply more equalization to the signals received at their inputs.

Similarly, the same embodiment of circuit 54 samples the over-equalized clock signal of FIG. 6 twice in one clock cycle to generate sample "a2" at time t=1, and sample "b2" at time t=3, and generates the control signal CTL such that CTL is indicative of a negative value (e.g., CTL is indicative of the sampled clock value "b2" minus the sampled clock value "a2"). In response to such a negative value of CTL, all of blocks 40, 41, 42, and 43 apply less equalization to the signals received at their inputs.

The same embodiment of circuit 54 samples the optimally equalized clock signal of FIG. 6 twice in one clock cycle to generate sample "a3" at time t=1, and sample "b3" at time t=3, and generates the control signal CTL such that CTL=0 (e.g., CTL is indicative of the sampled value "b3" minus the identical sampled value "a3"). In response to CTL=0, blocks 40, 41, 42, and 43 apply an unchanged amount of equalization to the signals received at their inputs.

Figure 7:
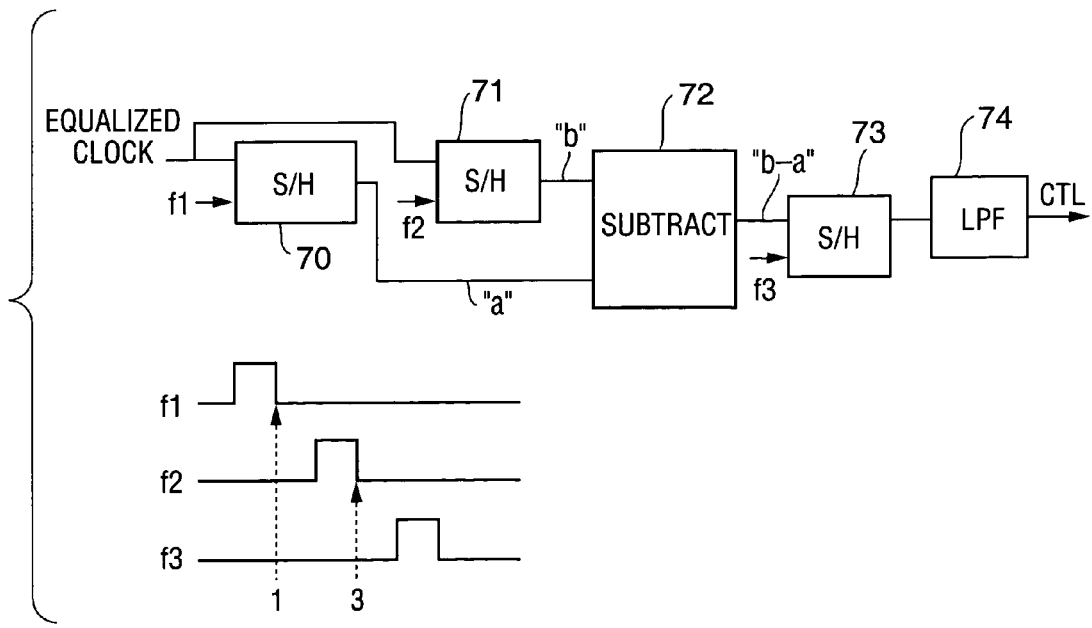
FIG. 7 is a block diagram of a preferred embodiment of equalization control circuit 54 of FIG. 4.

FIG. 7 is a block diagram of an embodiment of equalization control signal generation circuit 54 that belongs to the above-mentioned class. The FIG. 7 embodiment of circuit 54 operates in response to control signals whose timing are determined by delayed, stabilized versions of the equalized clock signal output from block 43.

In preferred implementations, PLL 53 is configured to generate a stabilized version of the equalized clock signal from block 43 (a "stabilized clock"), and L delayed versions of the stabilized clock (where $L \geq 1$), each delayed version of the stabilized clock having a different phase. The edges of the stabilized clock are aligned with transition edges of the equalized clock output from block 43, and the L-th delayed version of the stabilized clock is delayed by L×(36) degrees with respect to the stabilized clock. For example, a preferred implementation of PLL 53 generates the stabilized clock to have a falling edge at t=0 (of the time scale shown in FIG. 6) which is the positive-going zero crossing of the equalized clock (as shown in FIG. 6), and also generates nine delayed versions of the stabilized clock having falling edges at t=1, t=2, t=3, t=4, t=0', t=1', t=2', t=3', and t=4' (of the time scale shown in FIG. 6).

PLL 53 asserts the stabilized clock, and the nine delayed versions thereof, to each of data sampling blocks 50, 51, and 52 for sampling the equalized data signals output from blocks 40, 41, and 42.

The first, third, and fifth delayed versions of the stabilized clock (having falling edges at t=1, t=3, and t=0' in FIG. 6) are asserted by such implementation of PLL 53 to equalization control signal generation circuit 54. Specifically, the first delayed version of the stabilized clock (identified as signal f1 in FIG. 7) is asserted to one input of sample/hold unit 70 of FIG. 7, the third delayed version of the stabilized clock (identified as signal f2 in FIG. 7) is asserted to one input of sample/hold unit 73 of FIG. 7, and the fifth delayed version of the stabilized clock (identified as signal f3 in FIG. 7) is asserted to one input of sample/hold unit 73 of FIG. 7.

Thus, unit 70 samples the equalized clock signal (from block 43) at each falling edge of signal f1 (i.e., with a phase delay of 36 degrees after each rising edge of the equalized clock signal) to generate a sample "a," and unit 71 samples the equalized clock signal (from block 43) at each falling edge of signal f2 (i.e., with a phase delay of 108 degrees after each rising edge of the equalized clock signal) to generate a sample "b." Signals indicative of the two samples "a" and "b" are asserted by units 71 and 72 to subtraction circuit 72. In response, circuit 72 asserts an output indicative of the value "b" minus "a" to an input of sample/hold unit 73. Unit 73 samples the latter value at each falling edge of signal f3 (i.e., with a phase delay of 180 degrees after each rising edge of the equalized clock signal from block 43). The output of unit 73 is low-pass filtered in low pass filter 74, and the output of filter 74 (the control signal CTL) is asserted to each of blocks 40, 41, 42, and 43 (as shown in FIG. 4).

In some implementations of FIG. 4, equalization control signal generation circuit 54 keeps track of a sequence of difference values (each difference value being indicative of the difference between successive samples of the stabilized clock), and generates the control signal CTL in response to the sequence of difference values. By generating the control signal CTL with knowledge of the history of coefficient (difference value) variation, rather than in response to a single difference value generated at one instant, the amount of equalization can more reliably be changed in the optimal direction. For example, if the control signal CTL is generated in response (e.g., to be identical) to a single difference value, the amount of equalization applied may undesirably converge to a local optimum rather than a global optimum, or may oscillate rather than converge to a single value. If the control signal CTL is generated in response to a difference value sequence, the optimal direction of equalization control can reliably be found and the amount of equalization applied can typically be controlled to converge to a better local optimum amount (than can be attained if the signal CTL is generated in response to a single difference value) or to a global optimum amount.

In some implementations of FIG. 4, equalization control signal generation circuit 54 generates the control signal CTL to be indicative of the sum of (as well as the difference between) successive samples of the stabilized clock. For example, circuit 54 can generate the signal CTL to be indicative of the difference between the two most recent samples of the stabilized clock normalized by the sum of a sequence of samples of the stabilized clock (e.g., the sum of the two most recent samples, or the N most recent samples, of the stabilized clock, where N is greater than two). By normalizing each difference between samples with a sum of recent samples, the inventive system can cope with signals having greater dynamic range.

In some implementations of FIG. 4, block 53 is delay-locked loop circuitry (a "DLL") rather than a PLL. When implemented as a DLL, block 53 would generate a stabilized version of the equalized clock signal (from block 43) and also multiple delayed versions of this stabilized, equalized clock signal (each having a different phase). A DLL can often be implemented at lower cost than a PLL (where both circuits are to operate in response to the same input clock) and typically provides less phase lag (than a PLL) when the input clock has a lot of jitter.

It is also within the scope of the invention to employ circuitry other than a PLL or DLL to generate required, multiple delayed versions of an equalized clock signal (or of a stabilized version of an equalized clock signal).

In a variation on the FIG. 4 embodiment, subtraction circuit 72 is replaced by a comparison circuit which asserts (to an input of sample/hold unit 73) an output indicative of whether sample "b" is greater than, less than, or equal to sample "a." in such a case, the control signal CTL will have one of three discrete values at any time.

Because the control signal CTL will not change rapidly for a given configuration, rather low bandwidth for the control loop of FIG. 4 (i.e., the loop comprising elements 43, 53, and 54) is typically adequate.

Because the equalized clock signal asserted at the output of block 43 (or other equalized fixed pattern signal asserted to the inventive equalization control signal generation circuit, in variations on the embodiment described with reference to FIGS. 4 and 7) typically does not change significantly from cycle to cycle, the values subtracted in subtraction circuit 72 need not have been sampled during the same cycle of the equalized clock signal. This reduces the requirements for sample/hold units 70 and 71 (and corresponding circuitry of other implementations of circuit 54 of FIG. 4) and reduces the required speed of subtraction circuit 72 of FIG. 7 (and corresponding circuitry of alternative implementations of circuit 54 of FIG. 4).

In the FIG. 7 embodiment, the equalized clock is sampled with fixed phase. However, this is not necessarily true of alternative embodiments of the invention. For example, in some embodiments, an equalized clock is sampled with any of a number of different phases (i.e., with different phase from cycle to cycle) or with any predefined pattern that effectively samples it every clock cycle. Such a pattern can be predefined to help to achieve a global optimum for equalization in accordance with the invention.

More generally, in preferred embodiments of the inventive adaptive equalization circuit, one of the equalization filters equalizes a signal (typically a fixed pattern signal) thereby generating a first equalized signal (typically an equalized fixed pattern signal), each other equalization filter equalizes another signal (e.g., a data signal), and the control circuitry generates the equalization control signal in response to the first equalized signal. The first equalized signal can be an equalized fixed pattern signal, which can but need not be an equalized clock signal. In operation of some preferred embodiments, the adaptive equalization circuit of the invention equalizes a pixel clock signal received on the pixel clock channel of a DVI or HDMI link (thereby generating an equalized clock signal) and a data signal received on each of three data channels of the link, and the control circuitry thereof generates an equalization control signal (for use in equalizing all of the data signals and the pixel clock signal) in response to the equalized clock signal.

In use, a typical embodiment of a receiver (that includes an embodiment of the inventive adaptive equalization circuit) is coupled to a transmitter by a DVI or HDMI link (or other multi-channel serial link), and the transmitter transmits a clock signal (or other fixed pattern signal) and data signals over channels of the link having identical or nearly identical transfer functions (transmitted amplitude as a function of frequency). Typically, the transmitter uses the clock signal to transmit the data signals (e.g., the transmitter uses delayed versions of the clock signal, each having a different phase, together with the clock signal itself to transmit the data signals) and the data signals have a bit rate that is greater than (e.g., a multiple of) the clock signal's frequency. In the receiver, control circuitry of the adaptive equalization circuit samples an equalized version of the clock signal to generate an equalization control signal for use by all the equalization filters of the adaptive equalization circuit.

Preferably, the control circuitry of the inventive adaptive equalization circuit includes a PLL configured to generate "stabilized" signal (which is a stabilized version of an equalized fixed pattern signal) and also multiple delayed versions of the stabilized signal (each having a different phase). The control circuitry also includes a control signal generation circuit coupled to receive all or some of the delayed versions of the stabilized signal (e.g., two delayed versions of the stabilized signal) and the equalized fixed pattern signal itself. The control signal generation circuit is configured to sample the equalized fixed pattern signal using each of at least two delayed versions of the stabilized signal received from the PLL, and to generate an equalization control signal from the samples of the equalized fixed pattern signal.

In some preferred embodiments, the stabilized signal is a stabilized version of an equalized clock signal and the control signal generation circuit acquires two samples of the equalized clock signal per clock cycle (i.e., per cycle of the equalized clock signal), at different times (during the same half cycle) relative to the most recent zero crossing time of the equalized clock signal. The control signal generation circuit generates the equalization control signal by comparing the two samples or subtracting one sample from the other (and optionally filtering the result of such comparison or subtraction). The equalization control signal is indicative of the condition of equalization of the equalized clock signal, and is used to control each equalization filter of the adaptive equalization circuit. In implementations in which the equalization control signal is indicative of a value equal (or proportional) to the difference between each pair of samples generated in one clock cycle, the adaptive equalization circuit implements a control loop that operates to minimize the difference between the sample pairs and thereby achieve optimal equalization of the clock signal. When the adaptive equalization circuit is coupled to receive and equalize data signals and a clock signal that have been transmitted over different channels of a multi-channel serial link (the channels all having identical or similar transfer functions), use of the equalization control signal to equalize the data signals as well as the clock signal achieves optimal (or nearly optimal) equalization of each data signal as well as of the clock signal.

In variations on the implementations described in the previous paragraph, the control signal generation circuit acquires two samples of the equalized clock signal during different clock cycles (e.g., one during a first cycle at a first time after the equalized clock signal's most recent positive-going zero crossing, and another during another cycle at a second time after the equalized clock signal's most recent positive-going zero crossing), and generates the equalization control signal by comparing the two samples or subtracting one sample from the other (and optionally filtering the result of such comparison or subtraction). In other variations on the implementations described in the previous paragraph, the control signal generation circuit acquires N samples of the equalized clock signal (where $N \geq 2$) per clock cycle (or during each set of M consecutive clock cycles, where $M \geq 2$), and generates the equalization control signal as a result of processing the N samples.

In some of the implementations described in the two previous paragraphs, the control signal generation circuit acquires each sample of the equalized clock signal at a fixed time relative to the start of a cycle of the equalized clock signal (e.g., at a fixed time after the equalized clock signal's most recent positive-going zero crossing). In other ones of the implementations described in the two previous paragraphs, the control signal generation circuit acquires samples of the equalized clock signal at variable times within cycles of the equalized clock signal (e.g., at a first time after the most recent positive-going zero crossing during a first cycle, and then at a second time after the most recent positive-going zero crossing during another cycle). An example of the latter class of implementations is one in which a variation on the FIG. 7 implementation of equalization control circuit 54 uses sample/hold unit 70 to sample the equalized clock (output from block 43) at a first time after a positive-going zero crossing (of the equalized clock) during one equalized clock cycle, and uses sample/hold unit 71 to sample the equalized clock at a second time after a positive-going zero crossing during a subsequent equalized clock cycle.

The FIG. 4 embodiment of the invention is configured to assume that the input signal received by circuit 54 is an equalized clock signal (one type of equalized fixed pattern signal). Thus, circuit 54 can have a simple configuration (e.g., that described with reference to FIG. 7) to generate equalization control signal CTL in response to the input signal.

Figure 8:
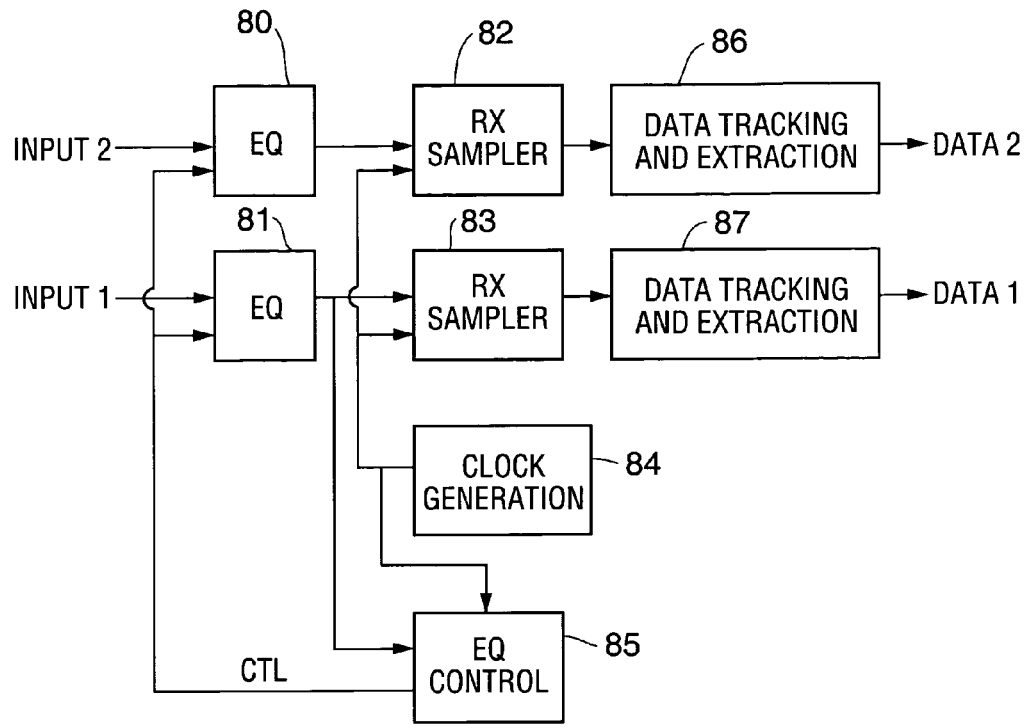
FIG. 8 is a block diagram of an equalization and data extraction circuit which includes another embodiment of the inventive adaptive equalization circuit.

Next, with reference to FIG. 8, we describe another class of embodiments in which the inventive adaptive equalization circuit includes at least two equalization filters, each coupled and configured to equalize a different signal in a manner at least partially determined by an equalization control signal, and control circuitry (e.g., circuit 85 of FIG. 8) for generating the equalization control signal for use by all the equalization filters. In FIG. 8, equalization block 80 equalizes a signal ("Input2") received on one channel of a serial link in response to control signal CTL generated by equalization control signal generation circuit 85, and equalization block 81 equalizes a signal ("Input1") received on another channel of the serial link in response to the control signal CTL. Preferably, blocks 80 and 81 are identical so they produce identical outputs in response to identical input signals (if the same control signal CTL is asserted to each). Each of blocks 80 and 81 applies an equalization filter to an input signal, and thus each block is sometimes referred to herein as an "equalization filter."

Clock generation circuit 84 asserts a clock signal, and delayed versions thereof, to each of data sampling blocks 82 and 83 and to equalization control signal generation circuit 85.

The control signal CTL is generated by circuit 85 in a manner to be described below, including by sampling the equalized signal output from block 81 using sampling edges determined by the clocks generated by circuit 84.

Block 82 samples the equalized signal from block 80 using the clock signal (and delayed versions thereof) from circuit 84 and asserts the resulting sequence of samples to data tracking and extraction block 86. In response, block 86 outputs a sequence of recovered data bits (the bit stream labeled "Data2" in FIG. 8). Block 83 samples the equalized signal from block 81 using the clock signal (and delayed versions thereof) from circuit 84 and asserts the resulting sequence of samples to data tracking and extraction block 87. In response, block 87 outputs a sequence of recovered data bits (the bit stream labeled "Data1" in FIG. 8).

Circuit 85 is configured to monitor the input signal it receives from block 81 to identify each occurrence of a predetermined fixed pattern in the input signal. For example, some implementations of block 85 are configured to identify each segment of the input signal that is indicative of a bit sequence having a predetermined pattern (each "fixed pattern segment"), and to treat each fixed pattern segment as an equalized fixed pattern signal.

Circuit 85 is also configured to sample the input signal using the clock signals that is receives from circuit 84, to use only some of the samples to generate equalization control signal CTL, and to discard the other samples. Typically, circuit 85 generates sets of samples of the input signal periodically (each set of samples including at least one sample of the input signal), uses only those samples that are samples of fixed pattern segments of the input signal to generate the signal CTL, and discards the other samples. Typically, circuit 85 includes logic for identifying each occurrence of a predetermined fixed pattern in the input signal, and circuit 85 is configured to temporarily store each sample of the input signal, generate the signal CTL using only temporarily stored samples that the logic has determined to have been generated from fixed pattern segments of the input signal, and discard all other temporarily stored samples. In some implementations, the equalized signal asserted at the output of block 81 (and received by circuit 85) is an equalized data signal indicative of a sequence of special characters and data words, and one of the special characters (or a sequence of two or more of the special characters) is indicative of the predetermined fixed pattern. For example, the special characters can be special characters of the type sent over a DVI link, or comma characters of the type sent over IBM-coded serial links such as fibre channel links.

Figure 9:
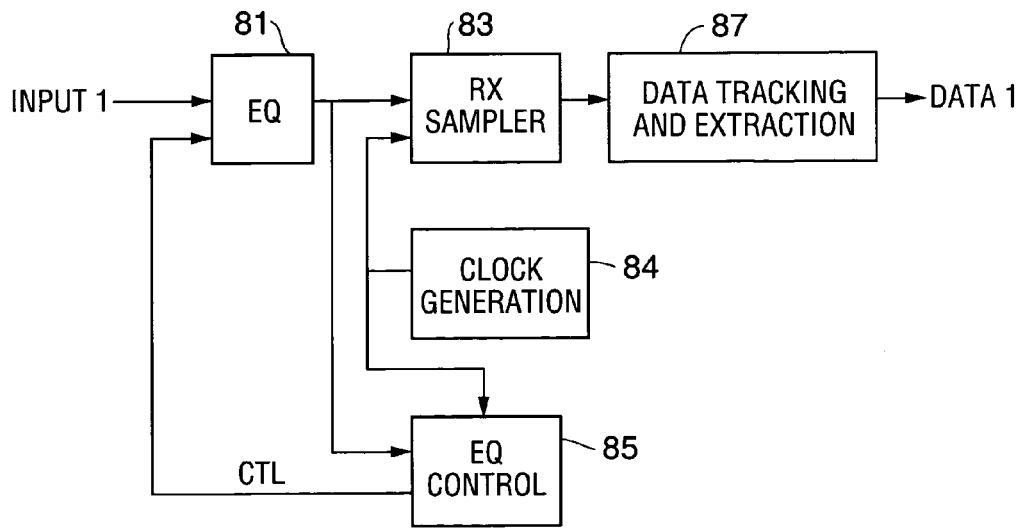
FIG. 9 is a block diagram of an equalization and data extraction circuit which includes another embodiment of the inventive adaptive equalization circuit.

We next describe another class of embodiments in which the inventive adaptive equalization circuit includes at least one equalization filter coupled and configured to equalize a signal in a manner at least partially determined by an equalization control signal, and control circuitry for generating the equalization control signal. The FIG. 9 circuit is an example of such an embodiment, and differs from the FIG. 8 circuit in that it does not include elements 80, 82, and 86 of FIG. 8. All elements of the FIG. 9 circuit that are numbered identically to corresponding elements of FIG. 8 are identical to such elements of FIG. 8 and the description thereof will not be repeated. For example, equalization control signal generation circuit 85 of FIG. 9 generates the same equalization control signal CTL (in the same manner) as does circuit 85 of FIG. 8. Typically, circuit 85 of FIG. 9 includes logic for identifying each occurrence of a predetermined fixed pattern in the input signal it receives from block 81, and circuit 85 of FIG. 9 is configured to temporarily store each sample of the input signal, generate the signal CTL using only temporarily stored samples that the logic has determined to have been generated from fixed pattern segments of the input signal, and discard all other temporarily stored samples. Circuit 85 of FIG. 9 asserts the signal CTL only to equalization filter 81, since FIG. 9 includes no other equalization filter. The FIG. 9 circuit is useful in a receiver to equalize (and extract data from) a signal received on a single channel of a serial link, whereas the FIG. 8 circuit is useful in a receiver to equalize (and extract data from) signals received on two channels of a multi-channel serial link.

In a class of embodiments, the invention is an adaptive equalization method including the steps of:

(a) transmitting signals over a serial link to a receiver that includes a set of adaptive equalization filters, where the set of adaptive equalization filters includes a first equalization filter (e.g., filter 43 of FIG. 4);

(b) generating an equalization control signal in a control loop (e.g., the control loop comprising elements 43, 53, and 54 of FIG. 4) including the first equalization filter, while the first equalization filter operates to equalize one of the signals transmitted over the link to the receiver;

(c) generating a first equalized signal, by equalizing said one of the signals in the first equalization filter in a manner at least partially determined by the equalization control signal; and (d) equalizing each other one of the signals transmitted over the link to the receiver, in a different one of the adaptive equalization filters of said set other than the first equalization filter, in a manner at least partially determined by the equalization control signal.

In some embodiments of the method, the link is a multi-channel serial link, and step (a) includes the step of transmitting each of the signals over a different channel of the link. In some embodiments of the method, the link is a multi-channel serial link including a set of channels having transfer functions that are at least substantially identical, step (a) includes the step of transmitting each of the signals over a different channel of said set of channels, and each of the adaptive equalization filters of said set of adaptive equalization filters is at least substantially identical to each other one of the adaptive equalization filters of said set of adaptive equalization filters.

In some embodiments of the method, the link is a multi-channel serial link including a clock channel and at least one data channel, step (a) includes the steps of transmitting a clock signal over the clock channel to the receiver and transmitting a data signal over the data channel to the receiver, and step (b) includes the step of generating the equalization control signal in the control loop while the first equalization filter operates to equalize the clock signal. Preferably, the first equalized signal generated in step (c) is an equalized clock signal, the equalized clock signal is an equalized version of the clock signal, and step (b) includes the steps of generating samples of the equalized clock signal by sampling the equalized clock signal at least twice per cycle of said equalized clock signal at different times during each said cycle; and generating the equalization control signal in response to the samples.

In some embodiments of the method, the link is a multi-channel serial link including at least a first channel and a second channel, step (a) includes the steps of transmitting a fixed pattern signal over the first channel to the receiver and transmitting another signal over the second channel to the receiver, and step (b) includes the step of generating the equalization control signal in the control loop while the first equalization filter operates to equalize the fixed pattern signal. Preferably, the first equalized signal generated in step (c) is an equalized fixed pattern signal, the equalized fixed pattern signal is an equalized version of the fixed pattern signal, and step (b) includes the steps of: generating samples of the equalized fixed pattern signal by sampling the equalized fixed pattern signal at least twice per cycle of said equalized fixed pattern signal at different times during each said cycle; and generating the equalization control signal in response to the samples.

In other class of embodiments, the invention is an adaptive equalization method including the steps of: (a) transmitting a signal over a serial link to a receiver that includes an adaptive equalization filter; (b) generating an equalization control signal in a control loop including the equalization filter, while the equalization filter operates to equalize the signal transmitted over the link to the receiver; and (c) generating an equalized signal, by equalizing said signal in the equalization filter in a manner at least partially determined by the equalization control signal, wherein step (b) includes the steps of: generating samples of the equalized signal; identifying at least one fixed pattern segment of the equalized signal, each said fixed pattern segment being a segment of the equalized signal that is indicative of a predetermined fixed pattern; and generating the equalization control signal using only a subset of the samples and without using any of the samples that is not a sample of one said fixed pattern segment. In some embodiments in this class, step (b) includes the steps of: temporarily storing each of the samples; identifying those of the temporarily stored samples that are samples of said at least one fixed pattern segment; and generating the equalization control signal without using any of the temporarily stored samples that is not a sample of one said fixed pattern segment.

It should be understood that while some embodiments of the present invention are illustrated and described herein, the invention is defined by the claims and is not to be limited to the specific embodiments described and shown.

What is claimed is:

1. An adaptive equalization circuit for equalizing at least two signals, comprising:
    at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and
    control circuitry, coupled and configured to generate the equalization control signal in response to the first equalized signal but not in response to any equalized signal generated by any of the equalization filters other than said first of the equalization filters, and to assert the equalization control signal to all the equalization filters, wherein said first of the at least two signals is a predetermined fixed pattern signal, said first of the equalization filters is configured to generate an equalized fixed pattern signal in response to the predetermined fixed pattern signal, and the control circuitry is configured to generate the equalization control signal in response to the equalized fixed pattern signal.

2. The circuit of claim 1, wherein the equalized fixed pattern signal is periodic and the control circuitry includes:
    circuitry configured to generate samples of the equalized fixed pattern signal by sampling the equalized fixed pattern signal at least twice per cycle of said equalized fixed pattern signal at different times during each said cycle, and to generate the equalization control signal in response to the samples.

3. The circuit of claim 1, wherein the equalized fixed pattern signal is periodic and the control circuitry includes:
    circuitry configured to generate samples of the equalized fixed pattern signal by sampling the equalized fixed pattern signal at variable times within cycles of the equalized fixed pattern signal, and to generate the equalization control signal in response to the samples.

4. The circuit of claim 1, wherein the equalized fixed pattern signal is periodic and the control circuitry includes:
    circuitry configured to generate pairs of samples of the equalized fixed pattern signal by sampling the equalized fixed pattern signal such that the samples in each of the pairs are acquired during different cycles of the equalized fixed pattern signal, each sample in said each of the pairs being acquired at a different time relative to the start of the cycle in which said sample is acquired, and to generate the equalization control signal in response to said pairs of samples.

5. An adaptive equalization circuit for equalizing at least two signals, comprising:
    at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and
    control circuitry, coupled and configured to generate the equalization control signal in response to the first equalized signal but not in response to any equalized signal generated by any of equalization the filters other than said first of the equalization filters, and to assert the equalization control signal to all the equalization filters, wherein said first of the at least two signals is a clock signal, each other one of the at least two signals is a data signal, said first of the equalization filters is configured to generate an equalized clock signal in response to the clock signal, and the control circuitry is configured to generate the equalization control signal in response to the equalized clock signal.

6. The circuit of claim 5, wherein the control circuitry includes:
    circuitry configured to generate samples of the equalized clock signal by sampling the equalized clock signal at least twice per cycle of said equalized clock signal at different times during each said cycle, and to generate the equalization control signal in response to the samples.

7. An adaptive equalization circuit for equalizing at least two signals, comprising:
    at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and
    control circuitry, coupled and configured to generate the equalization control signal in response to the first equalized signal and to assert the equalization control signal to all the equalization filters, wherein said first of the at least two signals is a clock signal, each other one of the at least two signals is a data signal, said first of the equalization filters is configured to generate an equalized clock signal in response to the clock signal, and the control circuitry is configured to generate the equalization control signal in response to the equalized clock signal, wherein the control circuitry includes:
    circuitry configured to generate samples of the equalized clock signal by sampling the equalized clock signal at variable times within cycles of the equalized clock signal, and to generate the equalization control signal in response to the samples.

8. An adaptive equalization circuit for equalizing at least two signals, comprising:
    at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and control circuitry, coupled and configured to generate the equalization control signal in response to the first equalized signal but not in response to any equalized signal generated by any of equalization the filters other than said first of the equalization filters, and to assert the equalization control signal to all the equalization filters, wherein said first of the at least two signals is a clock signal, each other one of the at least two signals is a data signal, said first of the equalization filters is configured to generate an equalized clock signal in response to the clock signal, and the control circuitry is configured to generate the equalization control signal in response to the equalized clock signal, wherein the control circuitry includes:

circuitry configured to generate pairs of samples of the equalized clock signal by sampling the equalized clock signal such that the samples in each of the pairs are acquired during different cycles of the equalized clock signal, each sample in said each of the pairs being acquired at a different time relative to the start of the cycle in which said sample is acquired, and to generate the equalization control signal in response to said pairs of samples.

9. An adaptive equalization circuit for equalizing at least two signals, comprising:

at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and control circuitry, coupled and configured to generate the equalization control signal in response to the first equalized signal and to assert the equalization control signal to all the equalization filters, wherein the control circuitry includes:

phase-locked loop circuitry, having an input coupled to an output of said first of the equalization filters, and configured to generate a stabilized signal in response to the first equalized signal and to generate multiple delayed versions of the stabilized signal, each having a different phase, where the stabilized signal is a stabilized version of the first equalized signal; and a control signal generation circuit, coupled to receive the first equalized signal and at least two of the delayed versions of the stabilized signal, and configured to generate samples of the first equalized signal by sampling the first equalized signal in response to the delayed versions of the stabilized signal received from the phase-locked loop circuitry and to generate the equalization control signal in response to said samples.

10. The circuit of claim 9, wherein said first of the at least two signals is a fixed pattern signal indicative of a predetermined fixed pattern, the first equalized signal is a periodic equalized fixed pattern signal, and the control signal generation circuit is configured to generate the samples of the periodic equalized fixed pattern signal by sampling the periodic equalized fixed pattern signal twice per cycle of said periodic equalized fixed pattern signal at different times during each said cycle.

11. The circuit of claim 9, wherein said first of the at least two signals is a clock signal, the first equalized signal is an equalized clock signal, and the control signal generation circuit is configured to generate the samples by sampling the equalized clock signal twice per cycle of said equalized clock signal, so as to generate two of the samples during the same half cycle of each cycle of said equalized clock signal.

12. The circuit of claim 11, wherein the control signal generation circuit is configured to generate the equalization control signal as a result of comparing each pair of the samples generated during the same cycle of the equalized clock signal.

13. The circuit of claim 11, wherein the control signal generation circuit is configured to generate a sample difference signal by subtracting one sample of each pair of the samples of the equalized clock signal generated during the same cycle of the equalized clock signal from the other sample of the pair, and to generate the equalization control signal in response to the sample difference signal.

14. The circuit of claim 9, wherein said one of the at least two signals is a fixed pattern signal indicative of a predetermined fixed pattern, the first equalized signal is a periodic equalized fixed pattern signal, and the control signal generation circuit is configured to generate pairs of samples of the periodic equalized fixed pattern signal such that the samples in each of the pairs are acquired during different cycles of the equalized fixed pattern signal, each sample in said each of the pairs being acquired at a different time relative to the start of the cycle in which said sample is acquired.

15. An adaptive equalization circuit for equalizing at least two signals, comprising:

at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and control circuitry, coupled and configured to generate the equalization control signal in response to the first equalized signal and to assert the equalization control signal to all the equalization filters, wherein the control circuitry includes:

delay-locked loop circuitry, having an input coupled to an output of said first of the equalization filters, and configured to generate a stabilized signal in response to the first equalized signal and to generate multiple delayed versions of the stabilized signal, each having a different phase, where the stabilized signal is a stabilized version of the first equalized signal; and a control signal generation circuit, coupled to receive the first equalized signal and at least two of the delayed versions of the stabilized signal, and configured to generate samples of the first equalized signal by sampling the first equalized signal in response to the delayed versions of the stabilized signal received from the delay-locked loop circuitry and to generate the equalization control signal in response to said samples.

16. The circuit of claim 15, wherein said first of the at least two signals is a clock signal, the first equalized signal is an equalized clock signal, and the control signal generation circuit is configured to generate the samples of the equalized clock signal by sampling the equalized clock signal twice per cycle of said equalized clock signal, so as to generate two of the samples during the same half cycle of each cycle of said equalized clock signal.

17. An adaptive equalization circuit for equalizing at least two signals, comprising:
   at least two equalization filters, each coupled and configured to equalize a different one of the at least two signals in a manner at least partially determined by an equalization control signal, wherein a first of the equalization filters is coupled and configured to generate a first equalized signal in response to a first of the at least two signals in a manner at least partially determined by the equalization control signal; and
   control circuitry, coupled and configured to generate the equalization control signal in response to the first equalized signal and to assert the equalization control signal to all the equalization filters, wherein the control circuitry is configured to generate samples of the first equalized signal, to identify at least one fixed pattern segment of the first equalized signal, each said fixed pattern segment being a segment of the first equalized signal that is indicative of a predetermined fixed pattern, and to generate the equalization control signal using only a subset of the samples and without using any of the samples that is not a sample of said at least one fixed pattern segment.

18. A receiver configured to be coupled to a multi-channel serial link to receive signals transmitted over the link by a transmitter, said receiver including:
   inputs, each configured to be coupled to the link to receive a respective one of the signals;
   at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
   control circuitry, coupled to the adaptive equalization filters and configured to generate the equalization control signal in response to the first equalized signal and to assert the equalization control signal to all the adaptive equalization filters, wherein the control circuitry is configured to generate samples of the first equalized signal, to identify at least one fixed pattern segment of the first equalized signal, each said fixed pattern segment being a segment of the first equalized signal that is indicative of a predetermined fixed pattern, and to generate the equalization control signal using only a subset of the samples and without using any of the samples that is not a sample of said at least one fixed pattern segment.

19. A receiver configured to be coupled to a multi-channel serial link to receive signals transmitted over the link by a transmitter, said receiver including:
   inputs, each configured to be coupled to the link to receive a respective one of the signals;
   at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
   control circuitry, coupled to the adaptive equalization filters and configured to generate the equalization control signal in response to the first equalized signal but not in response to an equalized signal generated by any of the adaptive equalization filters other than said first of the adaptive equalization filters, and to assert the equalization control signal to all the adaptive equalization filters, wherein said first of the signals is a fixed pattern signal indicative of a predetermined fixed pattern, said first of the adaptive equalization filters is configured to generate an equalized fixed pattern signal in response to the fixed pattern signal, and the control circuitry is configured to generate the equalization control signal in response to the equalized fixed pattern signal.

20. The receiver of claim 19, wherein the equalized fixed pattern signal is periodic and the control circuitry includes:
   circuitry configured to generate samples of the equalized fixed pattern signal by sampling the equalized fixed pattern signal at least twice per cycle of said equalized fixed pattern signal at different times during each said cycle, and to generate the equalization control signal in response to the samples.

21. The receiver of claim 19, wherein the equalized fixed pattern signal is periodic and the control circuitry includes:
   circuitry configured to generate samples of the equalized fixed pattern signal by sampling the equalized fixed pattern signal at variable times within cycles of the equalized fixed pattern signal, and to generate the equalization control signal in response to the samples.

22. The receiver of claim 19, wherein the equalized fixed pattern signal is periodic and the control circuitry includes:
   circuitry configured to generate pairs of samples of the equalized fixed pattern signal by sampling the equalized fixed pattern signal such that the samples in each of the pairs are acquired during different cycles of the equalized fixed pattern signal, each sample in said each of the pairs being acquired at a different time relative to the start of the cycle in which said sample is acquired, and to generate the equalization control signal in response to said pairs of samples.

23. A receiver configured to be coupled to a multi-channel serial link to receive signals transmitted over the link by a transmitter, said receiver including:
   inputs, each configured to be coupled to the link to receive a respective one of the signals;
   at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
   control circuitry, coupled to the adaptive equalization filters and configured to generate the equalization control signal in response to the first equalized signal but not in response to an equalized signal generated by any of the adaptive equalization filters other than said first of the adaptive equalization filters, and to assert the equalization control signal to all the adaptive equalization filters, wherein said first of the signals is a clock signal, each other one of the signals is a data signal, said first of the adaptive equalization filters is configured to generate an equalized clock signal in response to the clock signal, and the control circuitry is configured to generate the equalization control signal in response to the equalized clock signal.

24. The receiver of claim 23, wherein the control circuitry includes:
  circuitry configured to generate samples of the equalized clock signal by sampling the equalized clock signal at least twice per cycle of said equalized clock signal at different times during each said cycle, and to generate the equalization control signal in response to the samples.

25. A receiver configured to be coupled to a multi-channel serial link to receive signals transmitted over the link by a transmitter, said receiver including:
  inputs, each configured to be coupled to the link to receive a respective one of the signals;
  at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
  control circuitry, coupled to the adaptive equalization filters and configured to generate the equalization control signal in response to the first equalized signal and to assert the equalization control signal to all the adaptive equalization filters, wherein said first of the signals is a clock signal, each other one of the signals is a data signal, said first of the adaptive equalization filters is configured to generate an equalized clock signal in response to the clock signal, and the control circuitry is configured to generate the equalization control signal in response to the equalized clock signal, wherein the control circuitry includes:
  circuitry configured to generate samples of the equalized clock signal by sampling the equalized clock signal at variable times within cycles of the equalized clock signal, and to generate the equalization control signal in response to the samples.

26. A receiver configured to be coupled to a multi-channel serial link to receive signals transmitted over the link by a transmitter, said receiver including:
  inputs, each configured to be coupled to the link to receive a respective one of the signals;
  at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
  control circuitry, coupled to the adaptive equalization filters and configured to generate the equalization control signal in response to the first equalized signal and to assert the equalization control signal to all the adaptive equalization filters, wherein said first of the signals is a clock signal, each other one of the signals is a data signal, said first of the adaptive equalization filters is configured to generate an equalized clock signal in response to the clock signal, and the control circuitry is configured to generate the equalization control signal in response to the equalized clock signal, wherein the control circuitry includes:
  circuitry configured to generate pairs of samples of the equalized clock signal by sampling the equalized clock signal such that the samples in each of the pairs are acquired during different cycles of the equalized clock signal, each sample in said each of the pairs being acquired at a different time relative to the start of the cycle in which said sample is acquired, and to generate the equalization control signal in response to said pairs of samples.

27. A receiver configured to be coupled to a multi-channel serial link to receive signals transmitted over the link by a transmitter, said receiver including:
  inputs, each configured to be coupled to the link to receive a respective one of the signals;
  at least two adaptive equalization filters, each coupled to a different one of the inputs and configured to equalize a different one of the signals received at its respective input in a manner at least partially determined by an equalization control signal, wherein a first of the adaptive equalization filters is configured to generate a first equalized signal in response to a first of the signals in a manner at least partially determined by the equalization control signal; and
  control circuitry, coupled to the adaptive equalization filters and configured to generate the equalization control signal in response to the first equalized signal and to assert the equalization control signal to all the adaptive equalization filters, wherein the control circuitry includes:
  phase-locked loop circuitry having an input coupled to receive the first equalized signal, wherein the phase-locked loop circuitry is configured to generate a stabilized signal in response to the first equalized signal and to generate multiple delayed versions of the stabilized signal, each having a different phase, where the stabilized signal is a stabilized version of the first equalized signal; and
  a control signal generation circuit, coupled to receive the first equalized signal and at least two of the delayed versions of the stabilized signal, and configured to generate samples of the first equalized signal by sampling the first equalized signal in response to the delayed versions of the stabilized signal received from the phase-locked loop circuitry and to generate the equalization control signal in response to said samples.

28. The receiver of claim 27, wherein said first of the signals is a fixed pattern signal indicative of a predetermined fixed pattern, the first equalized signal is a periodic equalized fixed pattern signal, and the control signal generation circuit is configured to generate the samples of the periodic equalized fixed pattern signal by sampling the periodic equalized fixed pattern signal twice per cycle of said periodic equalized fixed pattern signal at different times during each said cycle.

29. The receiver of claim 27, wherein said first of the signals is a clock signal, the first equalized signal is an equalized clock signal, and the control signal generation circuit is configured to generate the samples of the equalized clock signal by sampling the equalized clock signal twice per cycle of said equalized clock signal, so as to generate two of the samples during the same half cycle of each cycle of said equalized clock signal.

30. The receiver of claim 29, wherein the control signal generation circuit is configured to generate the equalization control signal as a result of comparing each pair of the samples of the equalized clock signal generated during the same cycle of the equalized clock signal.

31. The receiver of claim 29, wherein the control signal generation circuit is configured to generate a sample difference signal by subtracting one sample of each pair of the samples of the equalized clock signal generated during the same cycle of the equalized clock signal from the other sample of the pair, and to generate the equalization control signal in response to the sample difference signal.

32. The receiver of claim 27, wherein said first of the signals is a fixed pattern signal indicative of a predetermined fixed pattern, the first equalized signal is a periodic equalized fixed pattern signal, and the control signal generation circuit is configured to generate pairs of samples of the periodic equalized fixed pattern signal such that the samples in each of the pairs are acquired during different cycles of the equalized fixed pattern signal, each sample in said each of the pairs being acquired at a different time relative to the start of the cycle in which said sample is acquired.

33. A receiver configured to be coupled to a multi-channel serial link to receive signals transmitted over the link by a transmitter, said receiver including:
   inputs, each configured to be coupled to the link to receive a respective one of the signals;
   at least two adaptive equalization filters, each coupled to a different one of the inputs and configured to equalize a different one of the signals received at its respective input in a manner at least partially determined by an equalization control signal, wherein first of the adaptive equalization filters is configured to generate a first equalized signal in response to a first of the signals in a manner at least partially determined by the equalization control signal; and
   control circuitry, coupled to the adaptive equalization filters and configured to generate the equalization control signal in response to the first equalized signal and to assert the equalization control signal to all the adaptive equalization filters, wherein the control circuitry includes:
   delay-locked loop circuitry having an input coupled to receive the first equalized signal, wherein the delay-locked loop circuitry is configured to generate a stabilized signal in response to the first equalized signal and to generate multiple delayed versions of the stabilized signal, each having a different phase, where the stabilized signal is a stabilized version of the first equalized signal; and
   a control signal generation circuit, coupled to receive the first equalized signal and at least two of the delayed versions of the stabilized signal, and configured to generate samples of the first equalized signal by sampling the first equalized signal in response to the delayed versions of the stabilized signal received from the delay-locked loop circuitry and to generate the equalization control signal in response to said samples.

34. The receiver of claim 33, wherein said first of the signals is a fixed pattern signal indicative of a predetermined fixed pattern, the first equalized signal is a periodic equalized fixed pattern signal, and the control signal generation circuit is configured to generate the samples of the periodic equalized fixed pattern signal by sampling the periodic equalized fixed pattern signal twice per cycle of said periodic equalized fixed pattern signal at different times during each said cycle.

35. A system, comprising:
   a transmitter;
   a receiver; and
   a multi-channel serial link coupled between the transmitter and the receiver, wherein the transmitter is configured to transmit signals over the link to the receiver, the receiver is configured to receive and equalize the signals, and the receiver includes:
   at least two adaptive equalization filters, each coupled and configured to equalize a different one of the signals transmitted over the link in a manner at least partially determined by an equalization control signal, wherein a first of the filters is configured to generate a first equalized signal in response to a first of the signals in a manner at least partially determined by the equalization control signal; and
   control circuitry, coupled to the adaptive equalization filters and configured to generate the equalization control signal in response to the first equalized signal and to assert the equalization control signal to all the adaptive equalization filters, wherein the control circuitry is configured to generate samples of the first equalized signal, to identify at least one fixed pattern segment of the first equalized signal, each said fixed pattern segment being a segment of the first equalized signal that is indicative of a predetermined fixed pattern, and to generate the equalization control signal using only a subset of the samples and without using any of the samples that is not a sample of said at least one fixed pattern segment.

36. A system, comprising:
   a transmitter;
   a receiver; and
   a multi-channel serial link coupled between the transmitter and the receiver, wherein the transmitter is configured to transmit signals over the link to the receiver, the receiver is configured to receive and equalize the signals, and the receiver includes:
   at least two adaptive equalization filters, each coupled and configured to equalize a different one of the signals transmitted over the link in a manner at least partially determined by an equalization control signal, wherein a first of the adaptive equalization filters is configured to generate a first equalized signal in response to a first of the signals in a manner at least partially determined by the equalization control signal; and
   control circuitry, coupled to the adaptive equalization filters and configured to generate the equalization control signal in response to the first equalized signal but not in response to an equalized signal generated by any of the adaptive equalization filters other than said first of the adaptive equalization filters, and to assert the equalization control signal to all the adaptive equalization filters, wherein said first of the signals is a fixed pattern signal indicative of a predetermined fixed pattern, said first of the adaptive equalization filters is configured to generate an equalized fixed pattern signal in response to the fixed pattern signal, and the control circuitry is configured to generate the equalization control signal in response to the equalized fixed pattern signal.

37. The system of claim 36, wherein the equalized fixed pattern signal is periodic and the control circuitry includes:
   circuitry configured to generate samples of the equalized fixed pattern signal by sampling the equalized fixed pattern signal at least twice per cycle of said equalized fixed pattern signal at different times during each said cycle, and to generate the equalization control signal in response to the samples.

38. A system, comprising:
   a transmitter;
   a receiver; and a multi-channel serial link coupled between the transmitter and the receiver, wherein the transmitter is configured to transmit signals over the link to the receiver, the receiver is configured to receive and equalize the signals, and the receiver includes:

at least two adaptive equalization filters, each coupled and configured to equalize a different one of the signals transmitted over the link in a manner at least partially determined by an equalization control signal, wherein a first of the adaptive equalization filters is configured to generate a first equalized signal in response to a first of the signals in a manner at least partially determined by the equalization control signal; and control circuitry, coupled to the adaptive equalization filters and configured to generate the equalization control signal in response to the first equalized signal but not in response to an equalized signal generated by any of the adaptive equalization filters other than said first of the adaptive equalization filters, and to assert the equalization control signal to all the adaptive equalization filters, wherein the link includes a clock channel and at least one data channel, and the transmitter is configured to transmit a data signal over each said data channel and to transmit a clock signal over the clock channel.

39. The system of claim 38, wherein at least one said data signal is indicative of video data, and the clock signal is a video clock signal.

40. The system of claim 38, wherein said first of the signals is the clock signal, said first of the adaptive equalization filters is configured to generate an equalized clock signal in response to the clock signal, and the control circuitry is configured to generate the equalization control signal in response to the equalized clock signal.

41. The system of claim 40, wherein the control circuitry includes:

circuitry configured to generate samples of the equalized clock signal by sampling the equalized clock signal at least twice per cycle of said equalized clock signal at different times during each said cycle, and to generate the equalization control signal in response to the samples.

42. An adaptive equalization method, including the steps of:

(a) transmitting signals over a serial link to a receiver that includes a set of adaptive equalization filters, where the set of adaptive equalization filters includes a first equalization filter;

(b) generating an equalization control signal in a control loop including the first equalization filter but none of the filters other than said first equalization filter, while the first equalization filter operates to equalize a first of the signals transmitted over the link to the receiver;

(c) generating a first equalized signal, by equalizing said first of the signals in the first equalization filter in a manner at least partially determined by the equalization control signal; and (d) equalizing each other one of the signals transmitted over the link to the receiver, in different ones of the adaptive equalization filters other than the first equalization filter, in a manner at least partially determined by the equalization control signal, wherein the link is a multi-channel serial link including a clock channel and at least one data channel, step (a) includes the steps of transmitting a clock signal over the clock channel to the receiver and transmitting a data signal over the data channel to the receiver, and step (b) includes the step of generating the equalization control signal in the control loop while the first equalization filter operates to equalize the clock signal.

43. The method of claim 42, wherein the first equalized signal generated in step (c) is an equalized clock signal, the equalized clock signal is an equalized version of the clock signal, and step (b) includes the steps of:

generating samples of the equalized clock signal by sampling the equalized clock signal at least twice per cycle of said equalized clock signal at different times during each said cycle; and generating the equalization control signal in response to the samples.

44. An adaptive equalization method, including the steps of:

(a) transmitting signals over a serial link to a receiver that includes a set of adaptive equalization filters, where the set of adaptive equalization filters includes a first equalization filter;

(b) generating an equalization control signal in a control loop including the first equalization filter but none of the filters other than said first equalization filter, while the first equalization filter operates to equalize a first of the signals transmitted over the link to the receiver;

(c) generating a first equalized signal, by equalizing said first of the signals in the first equalization filter in a manner at least partially determined by the equalization control signal; and (d) equalizing each other one of the signals transmitted over the link to the receiver, in different ones of the adaptive equalization filters other than the first equalization filter, in a manner at least partially determined by the equalization control signal, wherein the link is a multi-channel serial link including at least a first channel and a second channel, step (a) includes the steps of transmitting a fixed pattern signal as the first of the signals over the first channel to the receiver and transmitting another signal over the second channel to the receiver, and step (b) includes the step of generating the equalization control signal in the control loop while the first equalization filter operates to equalize the fixed pattern signal, wherein said fixed pattern signal is indicative of a predetermined fixed pattern.

45. The method of claim 44, wherein the first equalized signal generated in step (c) is a periodic equalized fixed pattern signal, the equalized fixed pattern signal is an equalized version of the fixed pattern signal, and step (b) includes the steps of:

generating samples of the equalized fixed pattern signal by sampling the equalized fixed pattern signal at least twice per cycle of said equalized fixed pattern signal at different times during each said cycle; and generating the equalization control signal in response to the samples.

* * * * *